Feb. 7, 1928. 1,658,412
P. PARKER
HEATING SYSTEM
Filed Jan. 6, 1922 2 Sheets-Sheet 1
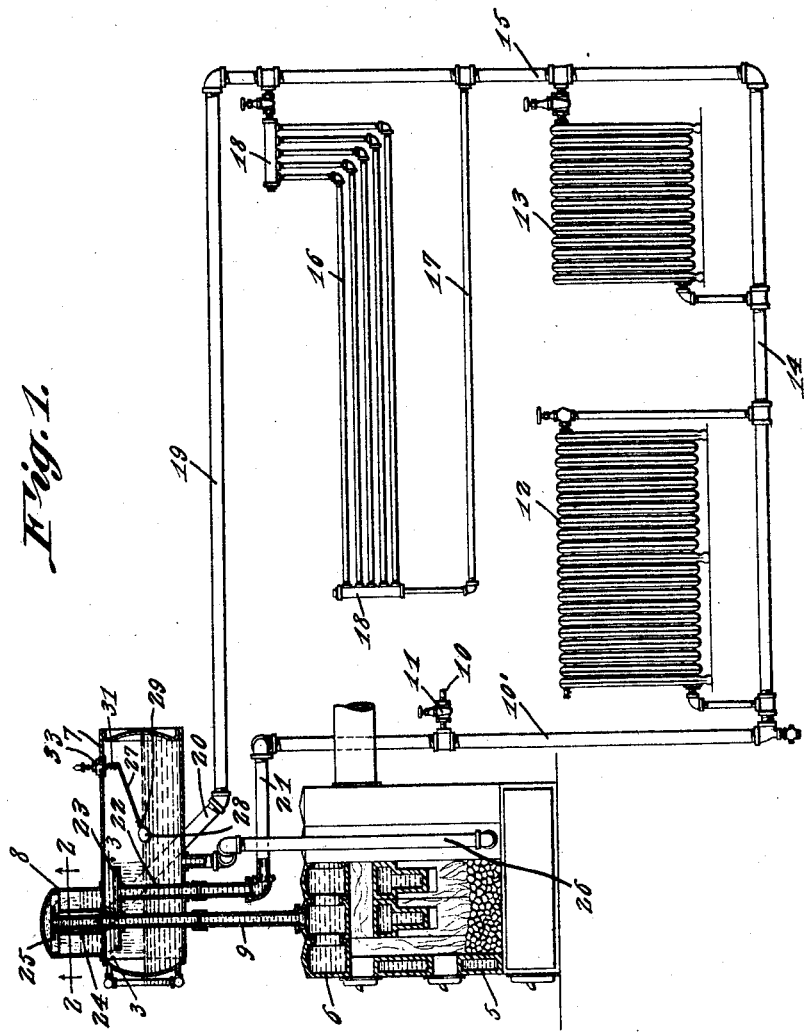
P. Parker, Inventor
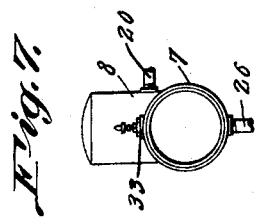

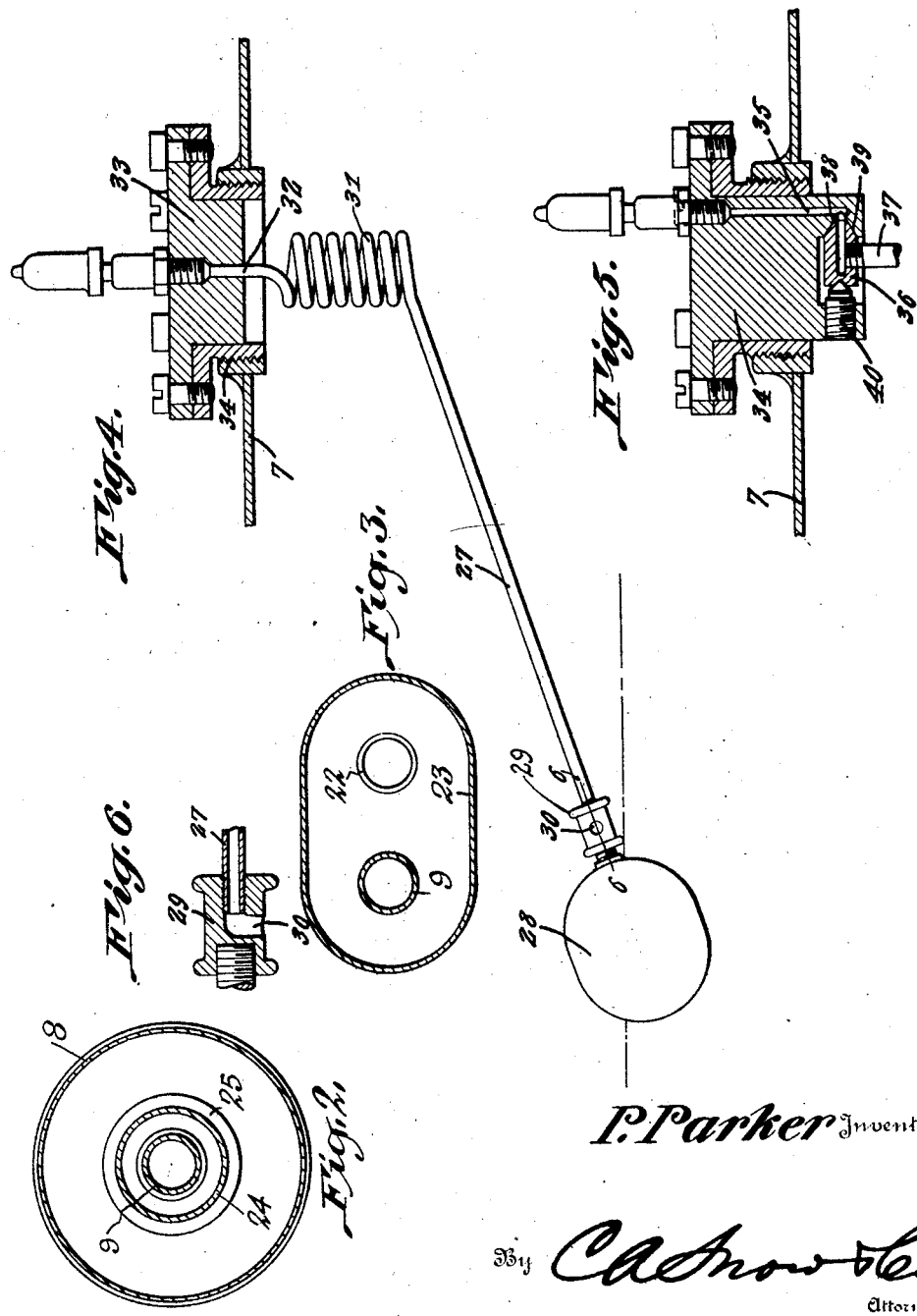

Patented Feb. 7, 1928.

1,658,412

UNITED STATES PATENT OFFICE.

PHILIP PARKER, OF WOBURN, MASSACHUSETTS.

HEATING SYSTEM.

Application filed January 6, 1922. Serial No. 527,408.

This invention relates to heating systems, and more particularly to heating systems of the hot-water type, the primary object of the invention being to provide a heating system to insure the circulation of water throughout the system.

Another object of the invention is to provide a heating system of this character including means for increasing the rapidity of circulation of the water through the apparatus.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a diagrammatical view of a heating system constructed in accordance with the present invention, and showing the main boiler and circulating system in section.

Figure 2 is a sectional view taken on line 2—2 of Figure 1.

Figure 3 is a sectional view taken on line 3—3 of Figure 1.

Figure 4 is a detail sectional view of one form of venting means.

Figure 5 is a sectional view through a modified form of venting means.

Figure 6 is a sectional view taken on line 6—6 of Figure 4.

Figure 7 is a detail view disclosing one of the pipes of the system entering the dome and a pipe entering the circulating tank, forming a part of the system.

Referring to the drawings in detail, the furnace is indicated generally by the reference character 5 which furnace includes a boiler section 6, that is in communication with the circulating tank 7 disposed thereabove. The circulating tank 7 is formed with a dome 8 into which the pipe 9 extends, and discharges fluid.

The system also includes a supply pipe 10 which may have connection with a suitable source of water supply, as through the valve member 11, whereby the system may be filled with water. The pipe 10 communicates with the pipe 10′, which in turn is in communication with radiators 12 and 13, so that when water enters the pipe 10′, the water will also fill the radiators. This pipe 10′ has a lower horizontal section 14, which has connection with the vertical pipe section 15 that is also in communication with the pipes 16, as through the pipe 17 and heads 18. Thus it will be seen that as water enters the pipe 10′, the same will pass into the radiators 12 and 13, and into pipes 15, 17 and 19.

A pipe 20 establishes communication between the dome 8 and pipe 19 to complete the system. Pipes 21 and 22 are in communication with the pipe 10′, the latter pipe being shown as extending into the tank 7, the open end thereof terminating at a point adjacent to the upper wall of the tank 7, where the same supports the pan 23.

This pan 23 is also formed with an opening to accommodate the pipe 9 which extends through the tank 7. Housing a portion of the pipe 9, is a pipe 24 that is disposed in spaced relation with the pipe 9 to provide a passageway therebetween, the upper end of the pipe 24 being spaced from the flanged head 25 to permit steam or water in the dome 8, to pass downwardly therebetween, where the steam is discharged onto the pan 23, condensing as it contacts with the relatively cool water in pan 23.

A return pipe 26 provides communication between the tank 7 and the lower portion of the boiler 6, to insure a circulation of fluid between the tank 7 and boiler 6. In order to properly carry out the condensing of the steam, it is necessary that the steam actually contact with the water in the tank 7, and since air in the tank 7 would form a natural separator between the steam entering at the top of the tank and the water contained therein, it is necessary to provide an air outlet adjacent to the water level in the tank 7. Since the water level in tank 7 is constantly changing, a hollow arm 27 is provided, which arm carries a float 28 at the free end thereof, the float having connection with the arm 27 as through the medium of the coupling 29 which is also formed with an opening 30 communicating with the hollow arm 27 to permit air to exhaust from the tank. The arm 27 includes a coiled portion 31 which has an extension 32 positioned in the plug 33, which in turn is threaded in the opening 34 formed in the upper wall of the tank 7. From the foregoing it will be seen that the outlet opening 30 is moved with respect to the level of the water within the tank 7 to maintain the air outlet opening of the tank 7 in a plane in proximity to the level of the water within the tank 7.

In the modified form of invention as illustrated by Figure 5 of the drawings, it will be seen that the plug 34 is formed with an opening 35 communicating with a movable head 36 that has connection with an arm 37, a portion of the arm being illustrated by Figure 5 of the drawings, but it is to be understood that this arm is constructed identically as shown by Figure 4 of the drawing. The head 36 is formed with a tapered portion 38 that seats in a tapered opening 39, and is held in position by means of the adjustable pin 40, so that the head may pivot with respect to the plug, permitting the arm 37 to move with the water level in the tank in which the same is positioned.

The operation of the system is as follows:

The system is filled with water through the valve 11, which is supplied from any suitable source of water supply not shown. The water flows into the pipe 10' and into the radiators 12, 13 and pipes 16 from where the water passes into pipe 19. Water passes through pipes 21 and 22, into pan 23, which pan overflows spilling the water into the tank 7.

Water from the tank 7 flows into the boiler 6 through pipe 26 to fill the same, and when the water has reached the desired level in the tank 7, the entire system is filled and ready for operation.

A fire is now started in the furnace, generating steam and causing an emulsion which passes upwardly through the pipe 9 and discharges into the dome 8, air passing through the space between the pipe 24 and pipe 9, and through the venting means illustrated more particularly by Figures 4 and 5 of the drawings. This emulsion of steam and water in boiler 6 and in the pipe 9, reduces the specific gravity of the column of water in the boiler 6 and pipe 9, in relation to the column of water in the pipe 26 and tank 7, causing the flow of water and steam from boiler 6 into the dome 8. The water has now been raised above the normal water line in tank 7 and flows through the pipes 20, 19, 16, 17, and 15, the radiators 12 and 13, pipes 10' and 21 and into the pan 23, where the same overflows into the tank 7.

The steam in the dome 8 passes therefrom, as previously described, from where the same enters the tank 7, where it is condensed by its contact with the relatively cold water falling from pan 23, and the surface of the water in tank 7.

Having thus described the invention, what is claimed as new is:—

In a hot water heating system, a boiler, a circulating tank supported above the boiler, a dome on the circulating tank, a pipe extending into the dome and establishing communication between the tank and dome, a pipe connected with the boiler and extended through the first mentioned pipe in spaced relation therewith and having its upper end terminating within the dome, to direct water and steam to the dome, radiators, pipes for establishing communication between the radiators, a pipe leading from the dome for delivering hot water to the radiators, a return pipe extending into the tank and adapted to return water to the tank from the radiators, a pan on one end of the last mentioned pipe and positioned under the first mentioned pipe to receive water therefrom, a pipe for establishing communication between the tank and boiler, and a pipe communicating with a source of water supply to supply the system with water.

In testimony that I claim the foregoing as my own, I have hereto affixed my signature.

PHILIP PARKER.